United States Patent [19]

Takano

[11] Patent Number: 5,249,070
[45] Date of Patent: Sep. 28, 1993

[54] LIQUID CRYSTAL DISPLAY

[75] Inventor: Hideo Takano, Atsugi, Japan

[73] Assignee: International Business Machines Corporation, Armonk, N.Y.

[21] Appl. No.: 776,158

[22] Filed: Oct. 15, 1991

[30] Foreign Application Priority Data

Oct. 15, 1990 [JP] Japan .................. 2-273509

[51] Int. Cl.⁵ .................................. G02F 1/133
[52] U.S. Cl. ........................ 359/54; 359/75; 359/102
[58] Field of Search ............... 359/54, 75, 78, 91, 359/93, 101, 102

[56] References Cited

U.S. PATENT DOCUMENTS

| | | | |
|---|---|---|---|
| 4,252,417 | 2/1981 | Scheffer et al. | 359/102 |
| 4,496,220 | 1/1985 | Goscianski | 359/78 |
| 4,566,758 | 1/1986 | Bos | 359/91 |
| 4,832,462 | 5/1989 | Clark et al. | 359/78 |
| 5,071,228 | 12/1991 | Waldmann et al. | 359/102 |

FOREIGN PATENT DOCUMENTS 0254122 12/1985 Japan .................. 359/102

OTHER PUBLICATIONS

Fahrenschon et al, "Deformation of a Pretilted Nematic Liquid Crystal Layer in an Electric Field", Applied Physics, vol. II, 1976 pp. #67-74.

Primary Examiner—William L. Sikes
Assistant Examiner—Huy K. Mai
Attorney, Agent, or Firm—David Aker

[57] ABSTRACT

A liquid crystal display and a method for producing the same. The display has a liquid crystal panel including a plurality of pixels, wherein the pixels have electrodes for applying a voltage thereto. A layer of a liquid crystal material is disposed between the electrodes. The pixels are configured so that a single tilt domain of the liquid crystal material exists when a voltage is not applied to the electrodes, and a first tilt domain and a second tilt domain of the liquid crystal material exist when a sufficient voltage is applied to said electrodes. This is achieved by using either a chiral dopant in twisted nematic liquid crystal material, or orientation layers producing a twist of less than 90°, or both. The contrast is very symmetrical for up/down viewing angles.

8 Claims, 8 Drawing Sheets

LIQUID CRYSTAL DISPLAY

FIELD OF THE INVENTION

This invention relates to a liquid crystal display panel for a twisted nematic liquid crystal display (TN-LCD). More particularly, it relates to such panels having multidomain display cells.

BACKGROUND ART

Of the various liquid crystal display elements, those using the twisted nematic mode (TM mode) have significant advantages which include low operation voltage, low power consumption and long life, and in recent years have been widely used. A TN-mode cell has anisotropic nematic liquid crystal thin films of a positive dielectric constant interposed between two glass substrates on which transparent electrodes are deposited. The longitudinal axis of the molecules of the liquid crystal are substantially parallel to the planes of the glass substrates. The upper and the lower glass substrates are arranged for a twist angle of almost 90°.

FIG. 1 schematically illustrates the arrangement of a conventional TN liquid crystal cell when a voltage is not applied to the cell. FIG. 2 illustrates the arrangement of the liquid crystal cell shown in FIG. 1 when an AC voltage is applied to the cell. In the figures, on the outsides of an upper glass substrate 2a and a lower glass substrate 2b, two polarization plates 1a and 1b are arranged, respectively, so that their transmission or absorption axes align with the direction of arrangement of molecules of the liquid crystal on the respective side of the cell. Transparent electrodes 3a and 3b, formed of a transparent conductive film such as, for example, an indium tin oxide (ITO) film, doped with tin oxide, are deposited, respectively, on the insides of the upper glass substrate 2a and the lower glass substrate 2b. After the electrodes, orientation films 4a and 4b are applied. A nematic liquid crystal layer 5 wherein the molecules 6 are represented as cylinders is interposed between the two glass substrates on which the transparent electrodes 3a and 3b are deposited and the orientation films 4a and 4b are applied.

FIG. 1 illustrates a state wherein the orientation film 4a on the glass substrate 2a is rubbed in one direction to align the longitudinal axes of the molecules 6 of the liquid crystal and to tilt the molecules 6 of the liquid crystal at an angle, that is, pre-tilt angle $a_0$, illustrated by a small angle of the molecules with respect to the plane of the substrate when the voltage is not applied. If an AC voltage from a source 7 is applied to the liquid crystal panel shown in FIG. 1, each molecule 6 of the liquid crystal in the middle of the cross section of the cell, as shown in FIG. 2, rises in one direction so that the angle with respect to the plane of the glass substrates is increased.

If the polarization axes of the polarizing plates 1a and 1b are parallel to each other, when the voltage is not applied, as in FIG. 1, incident light becomes linearly polarized light at the polarizing plate 1b, changes the direction of its polarization by an angle of 90° due to the twist of the molecules of the liquid crystal layer 5, and a dark state exists because the incident light is parallel to an absorption axis of the polarizing plate 1a, through which the light must exit. On the other hand, when the voltage is applied as in FIG. 2, the incident light which has been changed to linearly polarized light at the polarizing plate 1b reaches the polarizing plate 1a on the outgoing side with the same direction of polarization and a bright state exists because most of the incident light passes through the polarizing plate 1a.

If the polarization axes of the polarizing plates 1a and 1b are arranged so that they are orthogonal to each other, the dark and bright state for the liquid crystal cell are reversed with respect to the application of a voltage to the cell.

If AC voltage from source 7, shown in FIG. 2, is set to, for example, 5 V and the glass substrates 2a and 2b are observed from the upper and lower angles of view to measure a contrast ratio between dark and light states of the liquid crystal cell, then the graphs shown in FIG. 3 and FIG. 4 are obtained. In FIG. 3, U30 or D30 represent an angle of 30° from the upper or the lower side, respectively. In FIG. 4, the solid line and the dashed line represent the results of measurement from the upper and lower sides, respectively.

A problem associated with the conventional TN-LCD described above, is that the best angle of view cannot be set in the direction normal to the plane of the glass substrates. If the direction of the best angle of view from the glass substrate is defined as upward, the angle of view is symmetric in the horizontal direction. However, the angles of view, as shown in FIG. 3 and FIG. 4, are unsymmetrical in the vertical direction. To solve the problem, a method for covering the panel with a Fresnel lens was contrived. However, the method has its faults in that the presence of stripes is disagreeable and the costs are rising. Further, another method for forming micro irregularities on the surface of one side of the panel for enlarging the angle of view has been contrived. However, the method also has its faults in that roughness in the perception by the eyes is unavoidable and costs are increased by the necessity of forming the micro irregularities.

SUMMARY OF THE INVENTION

It is an object of the present invention to solve such problems, and in particular to provide a TN-LCD with the capability of providing a display having a desirable gradation, the best angle of view in a direction normal to the glass substrate, and the characteristic that angles of view are symmetric in the vertical direction with respect to the substrates.

A liquid crystal display according to the invention comprises a liquid crystal panel in which a plurality of pixels are arranged in a matrix, so that each pixel of the liquid crystal panel has a single domain when a voltage is not applied and has a first tilt domain and a second tilt domain of molecules of the liquid when the voltage is applied. The size of the first tilt domain is equal to that of the second tilt domain. The direction of the first tilt is opposite to that of the second tilt.

In accordance with the invention, to form first and second tilt domains, molecules of a liquid crystal in the middle of a cross section of a cell are oriented, at a pre-tilt angle of zero, parallel to the upper and lower glass substrates when a voltage is not applied. Further, to orient the molecules of the liquid crystal at a pre-tilt angle of zero in the middle of the cross section of the cell, when the voltage is not applied, the molecules of the liquid crystal are twisted in a direction, as shown in FIG. 7, which is opposite to that of the twist direction shown in FIG. 1 in which a pre-tilt of molecules of liquid crystal on the orientation films of the upper and the lower substrates are aligned in parallel to one another and are stabilized in this status.

Such twist direction of the present invention shown in FIG. 7 is realized (a) by adding chiral dopants into the liquid crystal which gives the twist direction shown in FIG. 7 in combination with rubbing directions which differ by 90 degrees on the upper and lower substrates, (b) by a bias rubbing in which an angle between the rubbing direction on the upper and lower substrates is smaller than 90 degrees, and (c) by adding the chiral dopants into the liquid crystal which results in a twist direction on the upper and lower substrates and by bias rubbing in which an angle between the rubbing direction on the upper and lower substrates is smaller than 90 degrees.

DETAILED DESCRIPTION OF THE PREFERRED EMBODIMENTS

Figure 6:
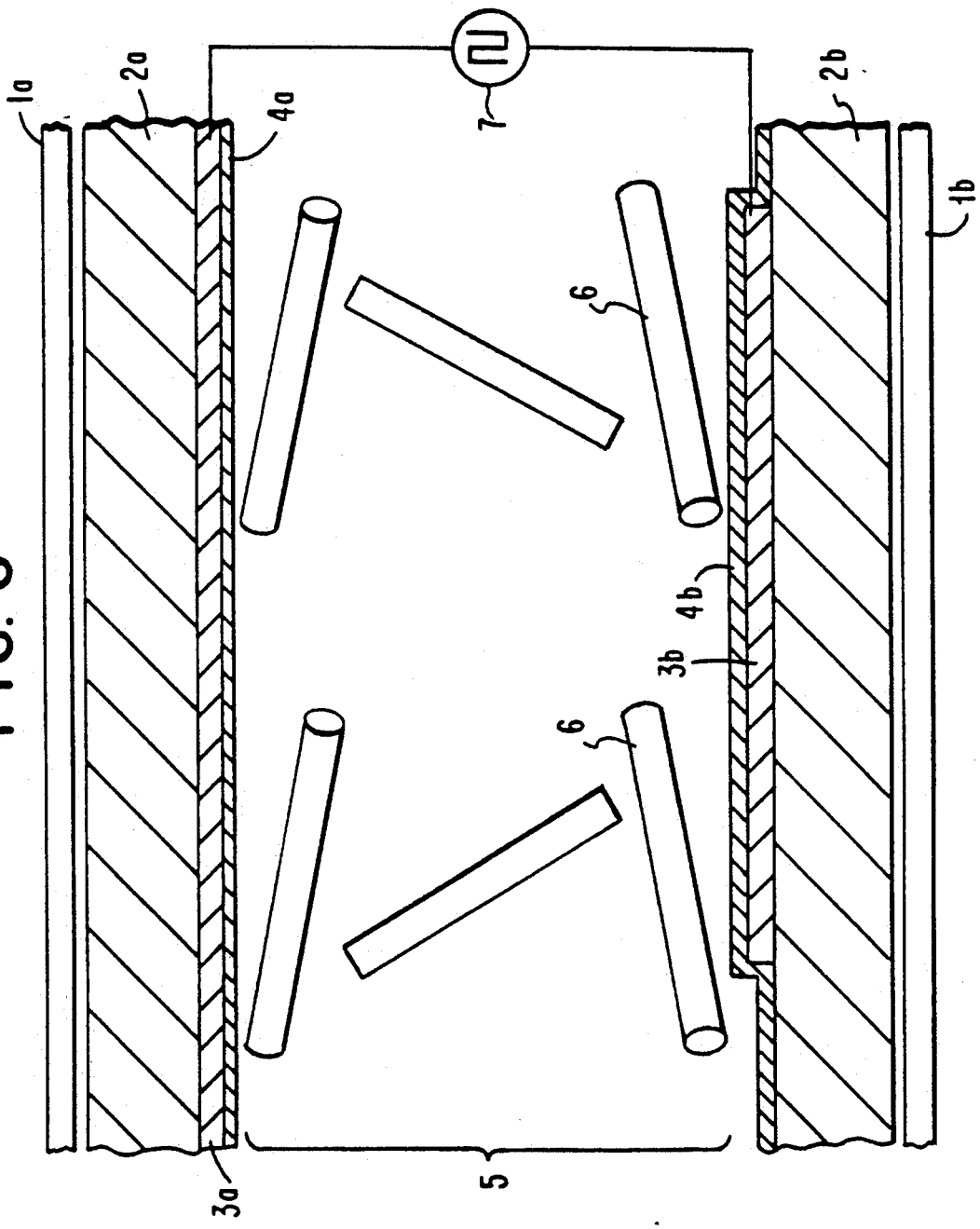
FIG. 6 is a schematic cross-sectional view, taken along line A-B of FIG. 8, of a liquid crystal cell in accordance with an embodiment of the invention where a voltage has been applied.
Figure 7:
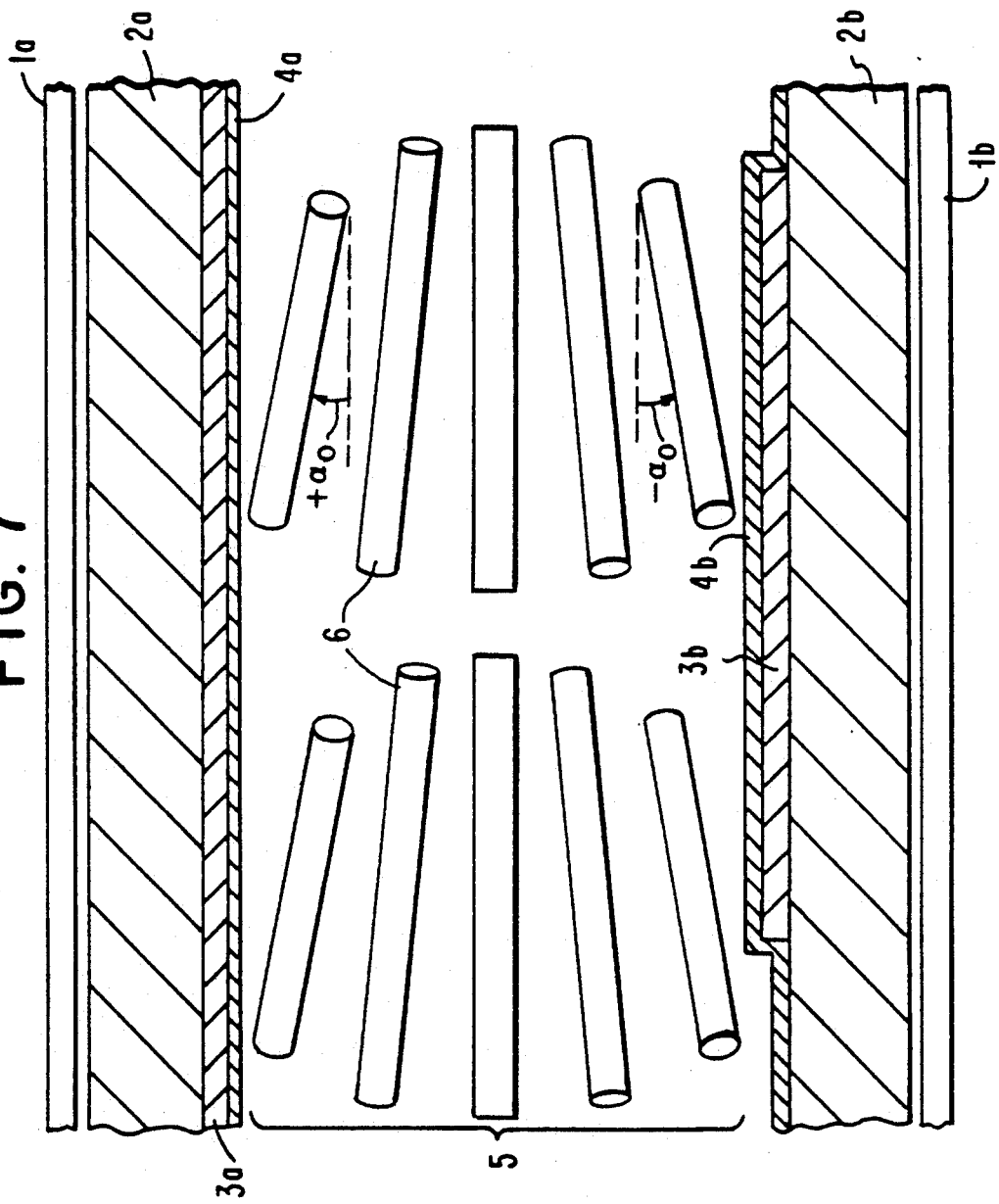
FIG. 7 is a schematic cross-sectional view, taken along line A-B of FIG. 8, of the embodiment of FIG. 6 to which a voltage has not been applied.
Figure 8:
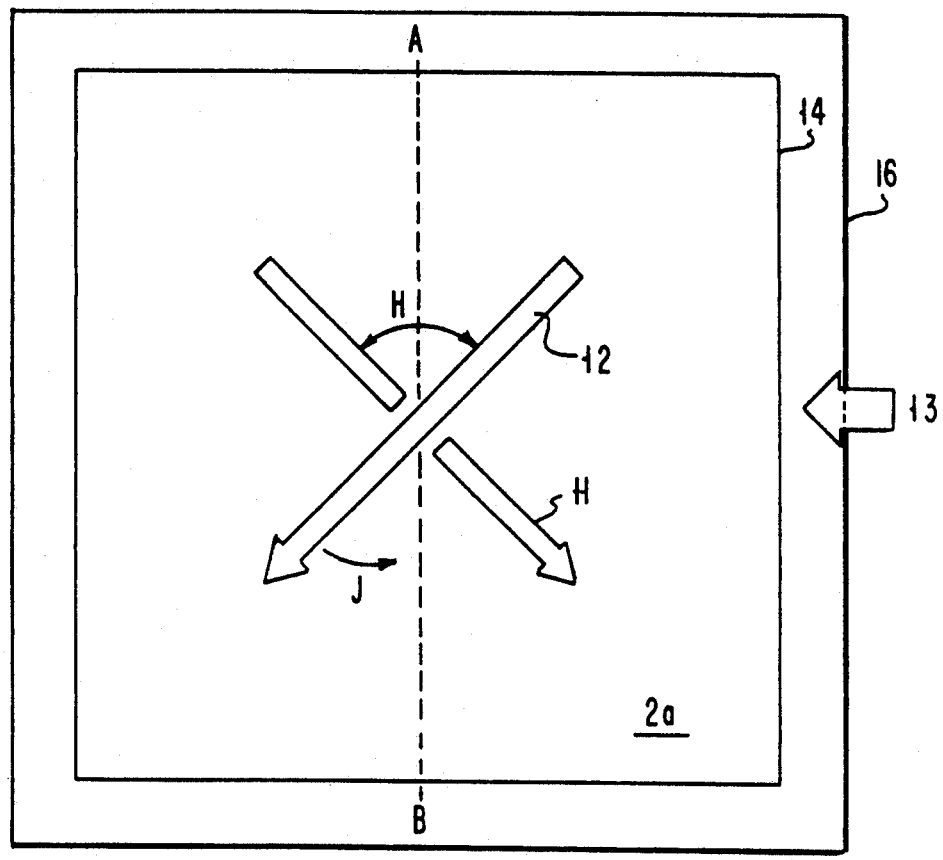
FIG. 8 is an illustration of rubbing directions in the embodiment of the invention of FIG. 6 and FIG. 7.

Prior to describing the preferred embodiment of the invention, shown in FIG. 6 and FIG. 7, the directions of rubbing in a liquid crystal cell in accordance with the invention are described with respect to FIG. 8.

FIG. 8 is an illustration viewed from above upper glass substrate 2a in a direction normal to the plane thereof. In FIG. 8, arrows 11 and 12 indicate a rubbing direction for the lower glass substrate 2b and the upper glass substrate 2a, respectively. It will be understood that while these rubbing directions apply to each pixel, they may also apply to an entire liquid crystal display panel 14, in a liquid crystal display 16. If a liquid crystal to which no chiral dopant has been added is used and an angle H between arrows 11 and 12 is set to 90°, a right-twisted orientation wherein the best angle of view is in the direction of the arrow 13 is obtained. However, if enough chiral dopant for a left-twisted orientation is added or the angle H is decreased to significantly less than 90°, as represented by the arrow J, orientation of molecules of the liquid crystal is obtained as shown in FIG. 7, where FIG. 7 is a schematic illustration of a cross section taken along A-B of FIG. 8 when no voltage is applied and FIG. 6 is a schematic illustration of a cross section taken along A-B of FIG. 8 when the voltage is applied.

The three cases (a), (b) and (c) outlined above are described in more detail below.

Viewed from the upper substrate, the head of arrow 12 rotates in a counter-clockwise direction toward the head of arrow 11. That is, the rubbing directions, viewed from the direction of the upper substrate, rotate in the counter-clockwise direction.

The chiral dopants used in case (a) rotate the molecules of the liquid crystal in the counter-clockwise direction, viewed from the upper substrate, which is the same rotation direction as the above described rotation of the rubbing direction, whereby the arrangement of the molecules of liquid crystal shown in FIG. 7 is realized.

In case (b), an angle H of, for example, 80 degrees, which is smaller than the 90 degrees shown in the FIG. 8, is used. In this condition, the molecules of liquid crystal are completely rotated in the counter-clockwise direction, viewed from the upper substrate, without any chiral dopants. The rotated direction of the molecules of liquid crystal is also the same as the rotation direction of the arrow 12 toward the arrow 11. Therefore the arrangement of the molecules of the liquid crystal shown in FIG. 7 is realized.

In case (c), an angle H of, for example, 85 degrees (between 90 degrees and 80 degrees) is used. At 85 degrees, the molecules of liquid crystal do not start the rotation in the counter-clockwise direction by themselves. Chiral dopants, which assist the rotation of the molecules of liquid crystal in the counter-clockwise direction, are therefore required so that the arrangement of the molecules of liquid crystal shown in FIG. 7 is obtained.

The arrangement of the molecules of liquid crystal shown in FIG. 7 is obtained due to the rotation direction of the molecules of the liquid crystal. This rotation direction is the same direction as the direction of rotation of the rubbing direction from the upper substrate to the lower substrate.

The arrangement of the molecules of liquid crystal, when the voltage is applied, as shown in FIG. 6, is produced by the combination of (1) the arrangement of the molecules of liquid crystal shown in FIG. 7 and (2) the inclined electric field which is generated as a result of the lower electrode 3(b) being smaller in size than the upper electrode 3a.

Figure 9:
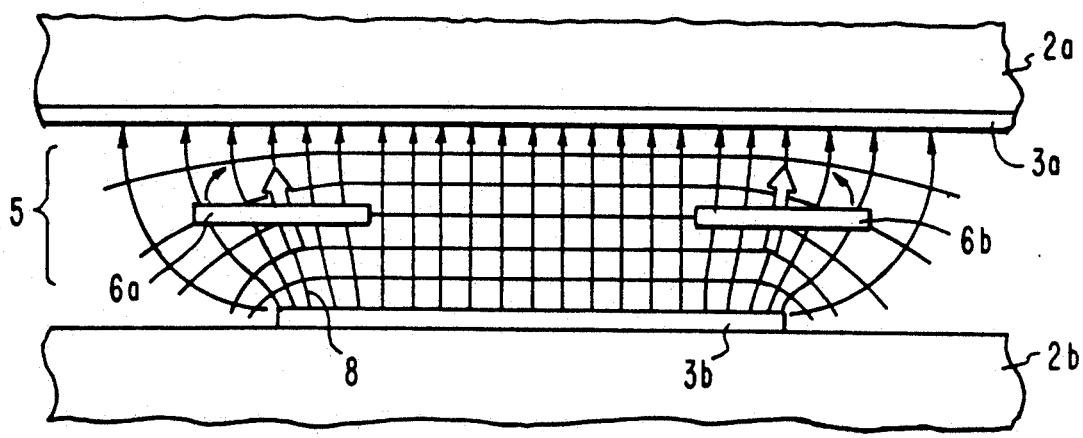
FIG. 9 is a schematic cross-sectional view showing the directions of the electric lines of force of the electric field in the embodiment of FIG. 6.
Figure 10:
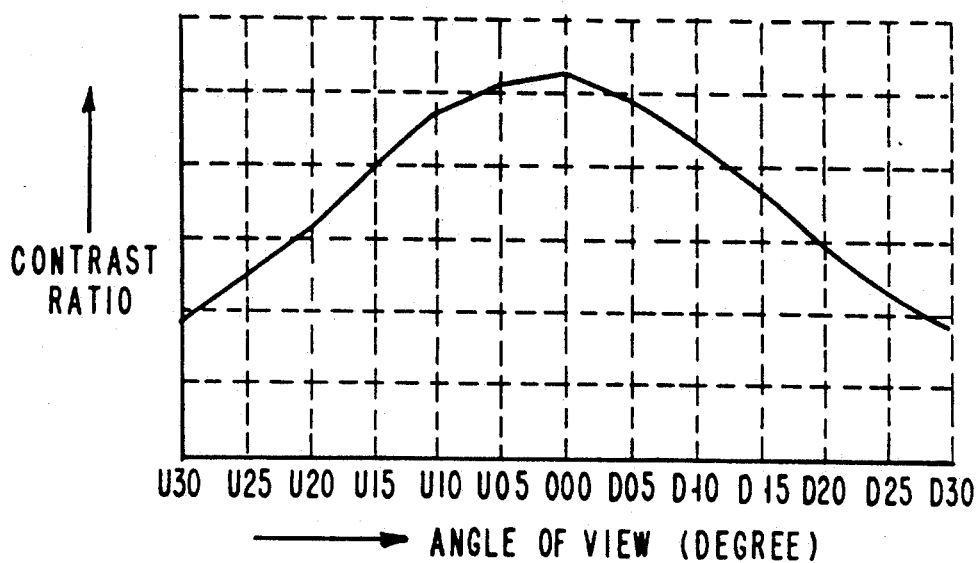
FIG. 10 and FIG. 11 are graphs showing the dependence of contrast ratio on angle of view from the upper and lower sides of the embodiment of FIG. 6.
Figure 11:
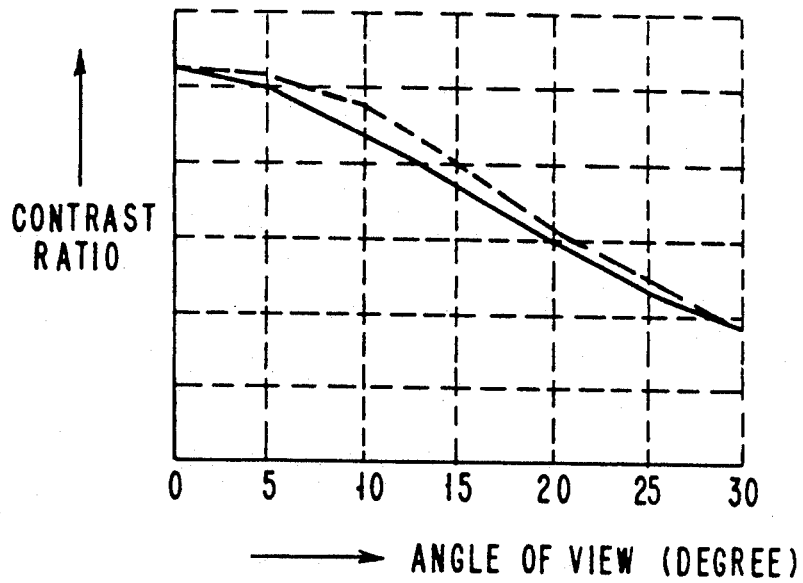

Referring to FIG. 9, the molecules 6a incline along the inclined electric field, so that the final arrangement shown in FIG. 6 is obtained. In this manner, the left side and the right side molecules in one picture element are symmetrically inclined when the voltage is applied, so that uniform contrast as shown in FIG. 10 and FIG. 11 is obtained regardless of the viewing angle.

Figure 5:
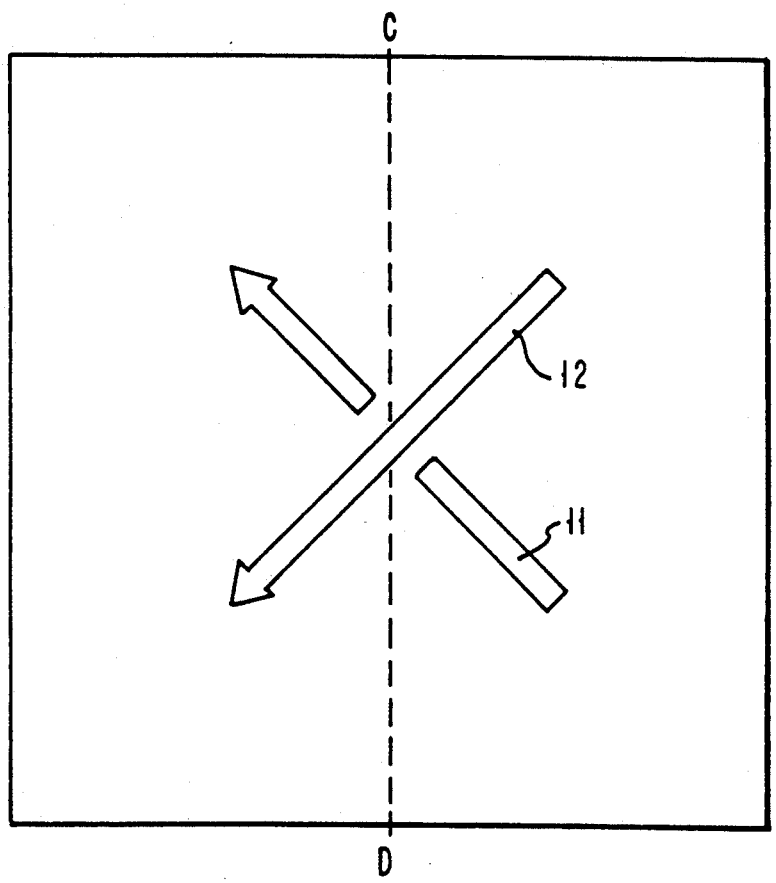
FIG. 5 is an illustration of the rubbing directions for prior art liquid crystal display cells.

For reference, the direction of rubbing in the prior art is shown in FIG. 5. A pre-tilt state caused by the rubbing shown in FIG. 5 allows a left-twisted orientation, so that the best angle of view is obtained in the direction of arrow 13 in FIG. 5.

Figure 1:
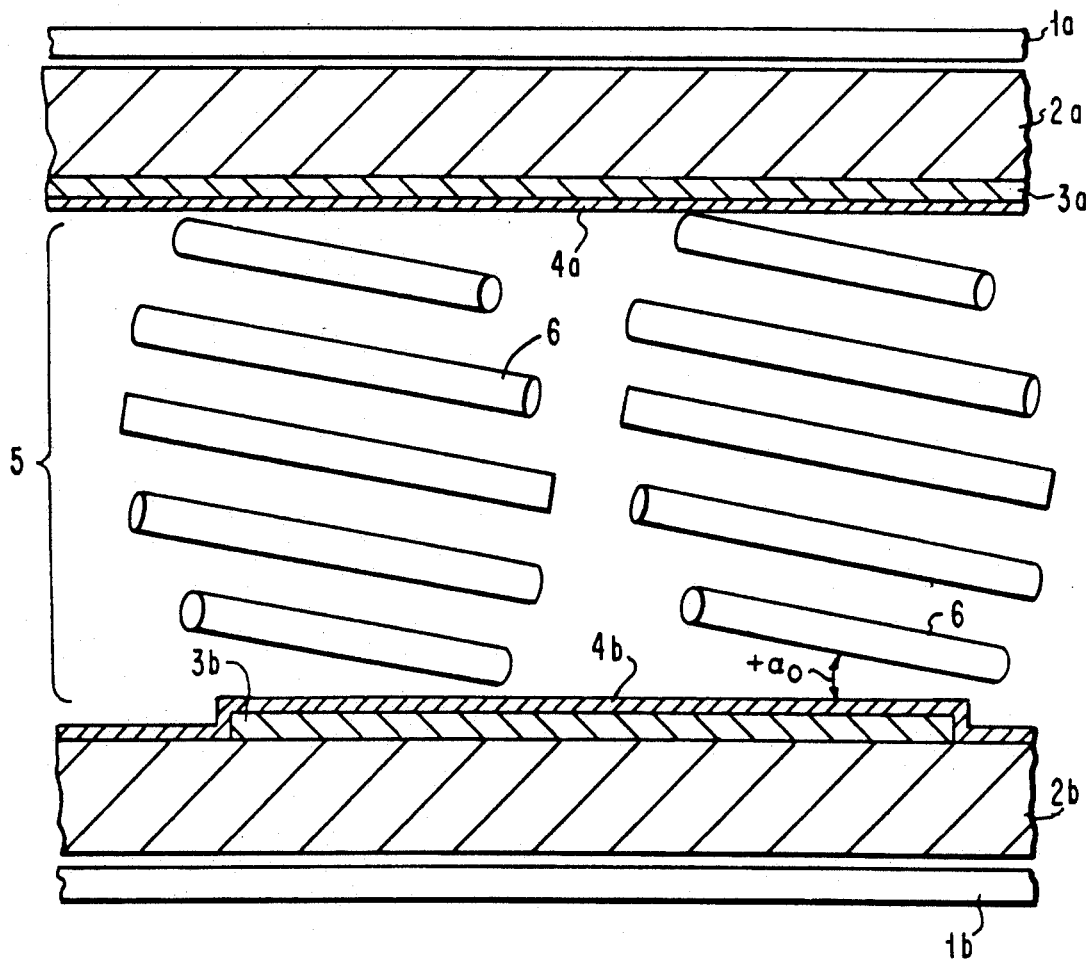
FIG. 1 is a schematic cross-sectional view, taken along line C-D of FIG. 5, of a liquid crystal cell of a conventional liquid crystal panel, when a voltage is not applied.
Figure 2:
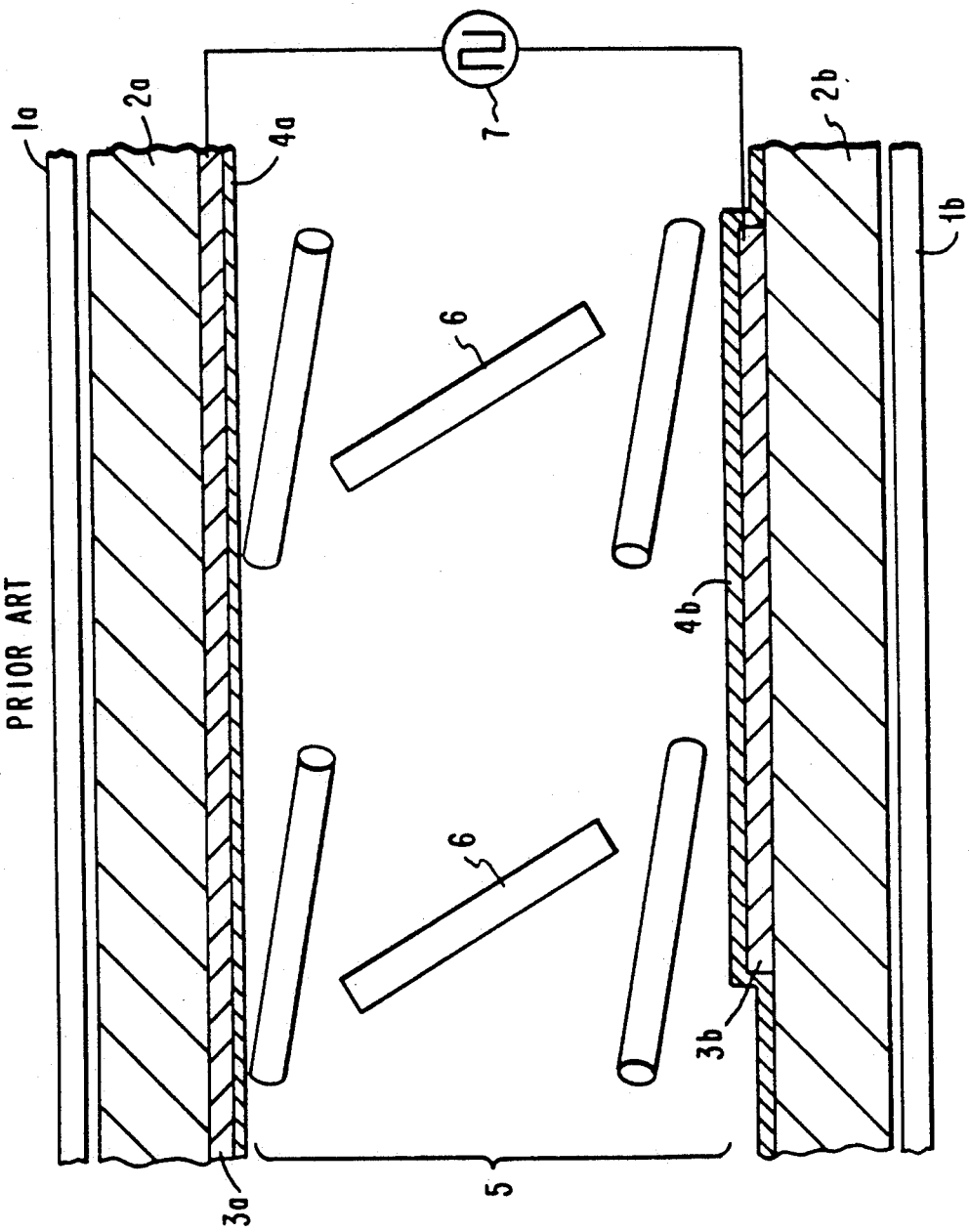
FIG. 2 is a schematic cross-sectional view, taken along line C-D of FIG. 5, of the liquid crystal cell of FIG. 1, when a voltage is applied.

The embodiments of the invention represented by FIG. 6 and FIG. 7 are similar to prior art counterparts except that the technique for orienting molecules of the liquid crystal in the liquid crystal cell differs. In the embodiments of the invention, a domain of each pixel is divided into a positive tilt domain and a negative tilt domain. The size of the positive tilt domain is made substantially equal to that of the negative tilt domain to obtain the best angle of view in a direction normal to the plane of the substrate and to obtain optical characteristics so that the visual field is symmetric in the horizontal direction as well as in the vertical direction. The optical characteristics in accordance with the principle of the invention are described below. If a voltage is applied to molecules of the anisotropic liquid crystal of a positive dielectric constant, each molecule of the liquid crystal is tilted so that its longitudinal axis becomes parallel to the direction of an electric field. As shown in FIG. 2, for the prior art, if the molecules of the liquid crystal are uniformly oriented in a pre-tilt state everywhere between the upper and the lower substrates, then application of a voltage between the upper and the lower transparent electrodes causes the molecules of the liquid crystal in the middle of the cross-section of the cell to be uniformly tilted in a direction determined by the pre-tilt state. In the example of FIG. 1, since the molecules of the liquid crystal are in a pre-tilt state clockwise, each molecule is also tilted clockwise when the voltage is applied, as shown in FIG. 2. However, the directions of molecules adjacent to the upper and the lower substrates are not changed due to interaction between the orientation films and the molecules of the liquid crystals, even though the voltage is applied. Thus, average tilts of the molecules of the liquid crystal in the entire cell turn in a fixed direction, depending upon application of the voltage. The direction in which the molecules of the liquid crystals are oriented, on average, in the entire cell, determines the direction of the optimum angle of view.

Referring to FIG. 2, in a conventional construction, the direction in which the optimum angle of view can be obtained, as is apparent from the figure, is not in the normal direction, but in a direction which lies and tilts counter-clockwise to the normal direction. However, referring to FIG. 7, since twist is opposite in direction to twist for stabilizing the pre-tilt state, the molecules of the liquid crystal extend to some degree and deform. The pre-tilt angle is not uniform in the entire cell, and varies continuously within the range from $-\alpha_0$ to $+\alpha_0$ along the direction of the thickness of the cell. In the middle of the cross-section of the cell, the pre-tilt angle is zero and the molecules of the liquid crystal are parallel to the upper or the lower substrate. In this state, when the electric field is applied perpendicularly to the substrates, it is not possible to uniquely determine whether the molecules of the liquid crystals are tilted clockwise or counter-clockwise. Further, since in the upper part and the lower part of the cross-section of the cell, pre-tilt directions are opposite to each other, orientation for tilt cannot be defined. However, if an electric field is not applied locally in a direction perpendicular to the glass substrates, the problem of ambiguity of tilt direction of the molecules of the liquid crystals does not exist and the direction of local tilt can be uniquely determined.

One of the reasons for why the electric field is not locally perpendicular to the glass base plates is distortion in the electric field at the ends of the electrodes, which appears when the upper and the lower transparent electrodes are different in size or shape from each other.

For a usual TFT-LCD, a transparent electrode on the side of TFT substrate is smaller in size than a transparent electrode on the side of the opposite substrate. For a simple matrix LCD or two terminal-type active matrix LCD (MIM, etc.), the size of a horizontal electrode is smaller than that of a vertical electrode in a cross-section taken, for example along line C-D of FIG. 5.

FIG. 9 shows the direction 8 of an electric field in a case where the upper and the lower transparent electrodes are different in shape from each other. It will be understood that like reference numerals indicate like parts in FIG. 1 and FIG. 2 and FIG. 6 and FIG. 7, respectively. To simplify FIG. 9, orientation films are omitted. In FIG. 9, at the center of the cell, molecules of the liquid crystal 6a and 6b without pre-tilted are shown. In this cross-section, the lower transparent electrode 3b is smaller in size than the upper transparent electrode 3a and the electric field is inclined with respect to the substrate at the ends of the lower transparent electrode. Therefore, the molecules 6a and 6b of the liquid crystal tilt clockwise and counterclockwise, respectively. Molecules of the liquid crystal between the molecules 6a and 6b tilt according to their distance from either the molecules 6a or 6b; that is, in the same direction as the tilt of either molecules 6a or 6b, depending upon which are closer to the molecules. Thus, as shown in the embodiment of FIG. 1, two tilt domains which are substantially the sam in size and opposite to each other in direction of tilt are obtained for each pixel.

Figure 3:
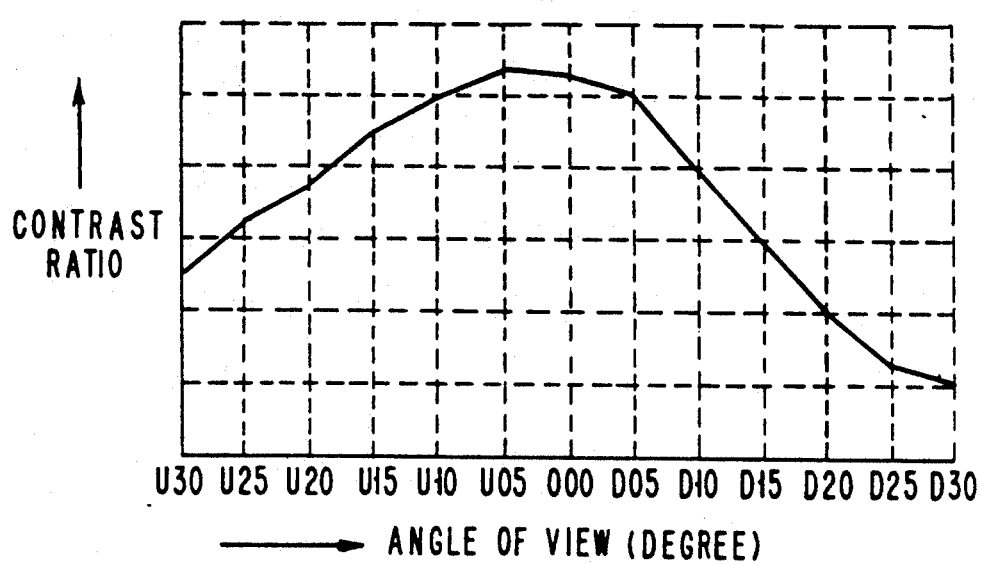
FIG. 3 and FIG. 4 are graphs showing the dependence of contrast ratio on angle of view from the upper and lower sides of a liquid crystal display panel in accordance with the prior art.
Figure 4:
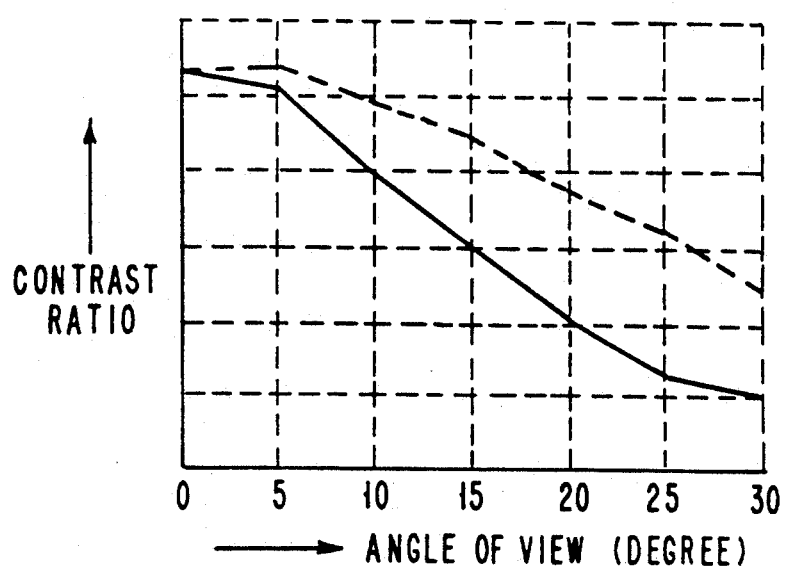

In the example according to the prior art shown in FIG. 2, since tilt of molecules of the liquid crystal is at an angle counter-clockwise with respect to a line normal to the plane of the substrate, different optical effects are observed, as shown in FIG. 3 and FIG. 4. However, in the embodiment of the invention shown in FIG. 6, since tilt of some of the molecules of the liquid crystal is at an angle counterclockwise with respect to a line normal to the plane of the substrate and tilt of other molecules of the liquid crystal is at an angle clockwise with respect to a line normal to the the plane, and these tilts are virtually identical in magnitude, but of opposite direction, a symmetrical optical effect can be obtained for the upper and lower side viewing angles.

What is claimed is:

1. In a liquid crystal display having a liquid crystal panel including a plurality of pixels, said pixels having electrodes formed on first and second substrates for applying a voltage thereto, and a layer of a nematic liquid crystal material having liquid crystal molecules disposed between the electrodes, the improvement comprising:

the electrodes being sized, shaped and positioned so that when said voltage is not applied between said electrodes, said liquid crystal molecules in each pixel are twisted between said first and second substrates, and when said voltage is applied between said electrodes, viewed from one cross section of said panel, substantially one half of said liquid crystal molecules of each pixel are tilted by an angle in a counter-clockwise direction from a normal line perpendicular to said substrated and substantially a remaining half of said liquid crystal molecules of each pixel are tilted by an angle in a clockwise direction form said normal line.

2. A liquid crystal display according to claim 1, wherein a size of a domain in which a half of said liquid crystal molecules of a pixel are tilted by an angle in a counter-clockwise direction from said normal line is substantially equal to a size of a domain in which a remaining half of said liquid crystal molecules of said pixel are tilted by an angle in a clockwise direction from said normal line.

3. In a liquid crystal display having a liquid crystal panel including a plurality of pixels, the pixels having electrodes formed on first and second substrates for applying a voltage thereto, and a layer of a nematic liquid crystal material having liquid crystal molecules disposed between the electrodes, the improvement comprising:

each of said pixels being configured so that when said voltage is not applied to said electrodes, liquid crystal molecules are twisted between said first and second substrates, and pre-tilt angle of said twisted liquid crystal molecules is continuously varied from a negative angle, which is formed by liquid crystal molecules adjacent to said first substrate, with respect to said first substrate, to a positive angle, which is formed by liquid crystal molecules adjacent to said second substrate, with respect to said second substrate, and through an angle of zero degrees, which is formed by liquid crystal molecule in a plane parallel to and substantially equidistant from said first and second substrates, with respect said first and second substrates, and when said voltage is applied to said electrodes, viewed from one cross section of said panel, liquid crystal molecules disposed in said plane and at one edge of said electrodes are tilted by an angle in a counterclockwise direction from a normal line perpendicular to said substrates, and liquid crystal molecules disposed in said plane and at an opposite edge of said electrodes are tilted by an angle in a clockwise direction form said normal line.

4. A liquid crystal display according to claim 3, wherein size of a domain in which said liquid crystal molecules disposed in said plane and at one edge of said electrodes are tilted by said angle in a counterclockwise direction form said normal line is substantially equal to size of a domain in which liquid crystal molecules disposed in said plane and at an opposite edge of said electrodes are tilted by an angle in a clockwise direction from said normal line.

5. In a liquid crystal display having a liquid crystal panel including a plurality of pixels, each of said pixels having first and second electrodes formed on first and second substrates, respectively for applying a voltage thereto, and a layer of a nematic liquid crystal material having liquid crystal molecules disposed between said first and second electrodes, the improvement comprising:

alignment layers formed on each of said electrodes, a rotating direction of said alignment layers viewed from said first substrate to said second substrate being the same as a twist direction of said liquid crystal molecules viewed from said first substrate to said second substrate, said first electrode being smaller than said second electrode to generate an electric field, which when viewed from one vertical cross section of said panel, a direction of said electric field between one edge portion of said first electrode and said second electrode being inclined in a counter-clockwise direction from a normal line perpendicular to said substrates, and a direction of said electric field between another edge portion of said first electrode and said second electrode being inclined at a second angle in a clockwise direction from said normal line.

6. A liquid crystal display according to claim 5, wherein an angle formed by said alignment layers is in a range of from 80 degrees to 90 degrees.

7. A liquid crystal display according to claim 6, wherein said liquid crystal material contains a chiral dopant which causes said liquid crystal molecules to twist in the same direction as said rotating direction of said alignment layers when viewed from said first substrate to said second substrate.

8. A liquid crystal display according to claim 7, wherein said first angle is substantially equal to said second angle.

* * * * *